(12) United States Patent
Watanabe

(10) Patent No.: US 10,304,168 B2
(45) Date of Patent: May 28, 2019

(54) IMAGE PROCESSING APPARATUS, IMAGE PICKUP APPARATUS, IMAGE PROCESSING METHOD, AND NON-TRANSITORY COMPUTER-READABLE STORAGE MEDIUM FOR CORRECTING DETERIORATION OF IMAGE

(71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 15/228,324

(22) Filed: Aug. 4, 2016

(65) Prior Publication Data
US 2017/0053387 A1    Feb. 23, 2017

(30) Foreign Application Priority Data
Aug. 17, 2015 (JP) ................................. 2015-160494

(51) Int. Cl.
| | |
|---|---|
| *G06T 5/00* | (2006.01) |
| *G06T 5/20* | (2006.01) |
| *G06T 5/50* | (2006.01) |
| *H04N 5/217* | (2011.01) |
| *H04N 5/232* | (2006.01) |
| *H04N 5/357* | (2011.01) |

(52) U.S. Cl.
CPC ................ *G06T 5/003* (2013.01); *G06T 5/20* (2013.01); *G06T 5/50* (2013.01); *H04N 5/217* (2013.01); *H04N 5/23206* (2013.01); *H04N 5/3572* (2013.01); *G06T 2207/20081* (2013.01)

(58) Field of Classification Search
CPC .. G06T 5/003; G06T 5/50; G06T 5/20; G06T 2207/20081; G06K 9/00456; H04N 5/3572; H04N 5/217; H04N 5/23206
See application file for complete search history.

(56) References Cited

U.S. PATENT DOCUMENTS

| | | | |
|---|---|---|---|
| 2010/0328480 A1* | 12/2010 | Kikuchi | H04N 5/23209 348/222.1 |
| 2011/0285879 A1* | 11/2011 | Hatakeyama | H04N 5/3572 348/241 |
| 2013/0038749 A1* | 2/2013 | Hatakeyama | H04N 5/217 348/222.1 |
| 2014/0218557 A1* | 8/2014 | Ebe | H04N 5/2351 348/222.1 |

(Continued)

FOREIGN PATENT DOCUMENTS

| | | |
|---|---|---|
| JP | 10336450 A | 12/1998 |
| JP | 2003143538 A | 5/2003 |

*Primary Examiner* — Jason A Flohre
(74) *Attorney, Agent, or Firm* — Rossi, Kimms & McDowell LLP

(57) ABSTRACT

An image processing apparatus includes a classifier (804*a*) which classifies a plurality of captured images into groups for each image capturing condition, a calculation processor (804*b*) which performs common calculation processing on a plurality of images classified into the same group and generate optical transfer function information or point spread function information for each image capturing condition, and an image restorer (804*c*) which performs restoration processing on the plurality of images based on the optical transfer function information or the point spread function information.

11 Claims, 6 Drawing Sheets

(56) References Cited

U.S. PATENT DOCUMENTS

2016/0098819 A1* 4/2016 Sugimoto .......... H04N 5/23206
    382/260
2016/0119560 A1* 4/2016 Hayashi ............. H04N 5/23212
    348/241

* cited by examiner

IMAGE PROCESSING APPARATUS, IMAGE PICKUP APPARATUS, IMAGE PROCESSING METHOD, AND NON-TRANSITORY COMPUTER-READABLE STORAGE MEDIUM FOR CORRECTING DETERIORATION OF IMAGE

BACKGROUND OF THE INVENTION

Field of the Invention

The present invention relates to an image processing apparatus which corrects a deterioration of an image caused by an image pickup optical system.

Description of the Related Art

For an object captured via an image pickup optical system, light emitted from one point cannot be converged to another point and has a minute spread due to an influence of a diffraction, an aberration, or the like that occurs in the image pickup optical system. Such a minutely-spread distribution is referred to as a PSF (point spread function). Due to the influence of the image pickup optical system, the captured image is formed with the PSF convolved with the image, and accordingly, the image is blurred and its resolution is deteriorated.

Recently, the captured image is typically stored as electronic data, and a method (image restoration processing) of correcting the deterioration of the image caused by the image pickup optical system has been proposed. However, if such image restoration processing is to be performed on a large number of images, a huge amount of time is necessary.

Japanese Patent Laid-open No. H10-336450 discloses a method of dividing a process into a step of performing common correction processing on various negative films and positive films by commonalizing pre-processing for data correction of an OHP and a step of performing different correction processing to shorten the pre-processing time.

However, Japanese Patent Laid-open No. H10-336450 does not disclose a method of accelerating image restoration processing depending on a huge amount of image capturing conditions. In particular, when the image restoration processing is to be performed on a huge amount of images, efficient processing is desired to shorten the processing time.

SUMMARY OF THE INVENTION

The present invention provides an image processing apparatus, an image pickup apparatus, an image processing method, and a non-transitory computer-readable storage medium which are capable of performing restoration processing on a large number of images in a short time.

An image processing apparatus as one aspect of the present invention includes a classifier configured to classify a plurality of captured images into groups for each image capturing condition, a calculation processor configured to perform common calculation processing on a plurality of images classified into the same group and generate optical transfer function information or point spread function information for each image capturing condition, and an image restorer configured to perform restoration processing on the plurality of images based on the optical transfer function information or the point spread function information.

An image pickup apparatus as another aspect of the present invention includes an image sensor configured to photoelectrically convert an optical image formed via an image pickup optical system to output image data, a classifier configured to classify a plurality of captured images generated based on the image data into groups for each image capturing condition, a calculation processor configured to perform common calculation processing on a plurality of images classified into the same group and generate optical transfer function information or point spread function information for each image capturing condition, and an image restorer configured to perform restoration processing on the plurality of images based on the optical transfer function information or the point spread function information.

An image processing method as another aspect of the present invention includes the steps of classifying a plurality of captured images into groups for each image capturing condition, performing common calculation processing on a plurality of images classified into the same group and generating optical transfer function information or point spread function information for each image capturing condition, and performing restoration processing on the plurality of images based on the optical transfer function information or the point spread function information.

A non-transitory computer-readable storage medium as another aspect of the present invention stores an image processing program causing a computer to execute a process including the steps of classifying a plurality of captured images into groups for each image capturing condition, performing common calculation processing on a plurality of images classified into the same group and generating optical transfer function information or point spread function information for each image capturing condition, and performing restoration processing on the plurality of images based on the optical transfer function information or the point spread function information.

Further features of the present invention will become apparent from the following description of exemplary embodiments with reference to the attached drawings.

DESCRIPTION OF THE EMBODIMENTS

Figure 1:
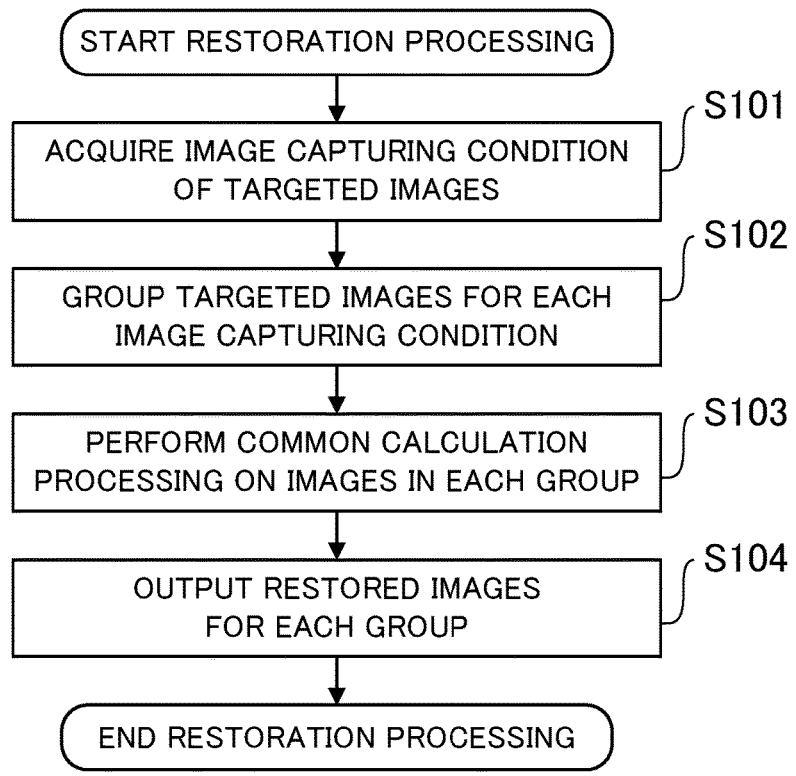
FIG. 1 is a flowchart of an image processing method in Embodiment 1.

Exemplary embodiments of the present invention will be described below with reference to the accompanied drawings.

First of all, an outline of an image processing method (image restoration processing) in this embodiment will be described. Expression (1) below is satisfied where, in a real space $(x,y)$, $f(x,y)$ is an image which is not deteriorated by an optical system (image pickup optical system), $h(x,y)$ is a PSF (point spread function), and $g(x,y)$ is a deteriorated image.

$$g(x,y)=\iint f(X,Y)*h(x-X,y-Y)dXdY \quad (1)$$

When the Fourier transform is performed for expression (1) to convert the real space (x,y) to a frequency space (u,v), expression (2) below is satisfied.

$$G(u,v)=F(u,v)*H(u,v) \quad (2)$$

In expression (2), F(u,v), G(u,v), and H(u,v) are results of the Fourier transform of f(x,y), g(x,y), and h(x,y), respectively. Accordingly, expression (3) below is satisfied.

$$F(u,v)=G(u,v)/H(u,v) \quad (3)$$

Expression (3) means that the result F(u,v) of the Fourier transform of the image f(x,y) which is not deteriorated can be obtained by dividing the result G (u,v) of the Fourier transform of the deteriorated image g(x,y) in the frequency space by the result H(u,v) of the Fourier transform of h(x,y) as the point spread function (PSF). Therefore, the image f(x,y) which is not deteriorated can be obtained by performing the inverse Fourier transform for F(u,v).

Actually, however, if such processing is performed to obtain the image which is not deteriorated, a noise caused by an image pickup element is amplified and there is a high possibility of generating ringing on an image. Due to this negative effect on the image processing, it is difficult to obtain an appropriate image by a dividing method using simple inverse characteristics. To solve the problem, using the Wiener filter W(u,v) represented by expression (4) below is known as image restoration processing of suppressing the amplification of the noise.

$$W(u,v)=1/H(u,v)*|H(u,v)|^2/(|H(u,v)|^2+\Gamma) \quad (4)$$

In expression (4), symbol H(u,v) denotes an optical transfer function (OTF), and symbol $\Gamma$ denotes an adjustment term (constant) to decrease an amount of amplification of the noise.

Even when any noise does not exist in the image as a target of the image restoration processing, a harmful effect such as ringing and other dips of edges tend to occur if an amplification factor becomes too large. Therefore, the control of the adjustment term $\Gamma$ is extremely important. Thus, the adjustment term $\Gamma$ is used to control the amplification factor. The adjustment term $\Gamma$ is not limited to a constant, and instead, an adjustment term $\Gamma(u,v)$ considering a frequency characteristic may be used.

Multiplying W(u,v) represented by expression (4) by the result G(u,v) of the Fourier transform of the deteriorated image g(x,y), a phase component of the PSF caused due to the diffraction or the aberration that occurs in the optical system (image pickup optical system) becomes zero and frequency characteristics of an amplitude component of the PSF are amplified to be able to obtain a high-resolution and appropriate image. In other words, frequency space information R(u,v) of the image restored by the image restoration processing using the Wiener filter W(u,v) is represented as the following expression (5).

$$R(u,v)=G(u,v)*W(u,v) \quad (5)$$

In this embodiment, the Wiener filter W(u,v) and the adjustment term $\Gamma$ are referred to also as a restoration gain frequency characteristic and a restoration gain adjustment term, respectively.

Hereinafter, applying expression (4) to a real image pickup apparatus will be considered. Main configuration elements in the image pickup apparatus are an image pickup optical system, an image sensor, and an image processing apparatus. Symbol H(u,v) in expression (4) is an optical transfer function relating to a specific image capturing condition. The image capturing condition is a focal length and an F number as parameters of the image pickup optical system, an object distance for photography, an image height position in an image, a pixel pitch of the image sensor, and the like. If an optical element such as an optical low-pass filter is inserted, it is preferred that an influence of the optical element is also considered as the image capturing condition. As described above, the optical transfer function H(u,v) varies depending on the image capturing condition.

On the other hand, if the image capturing condition such as parameters of the image pickup optical system and the image sensor is constant, the optical transfer function H(u,v) does not (substantially) change even when an object to be captured is changed. This is because the image restoration processing in this embodiment is premised on an incoherent model assuming that an illumination light source has a sufficiently-large shape.

Hereinafter, in each embodiment, an image processing apparatus and an image pickup apparatus which are capable of performing restoration processing on a large number of images in a short time will be specifically described.

Embodiment 1

Figure 8:
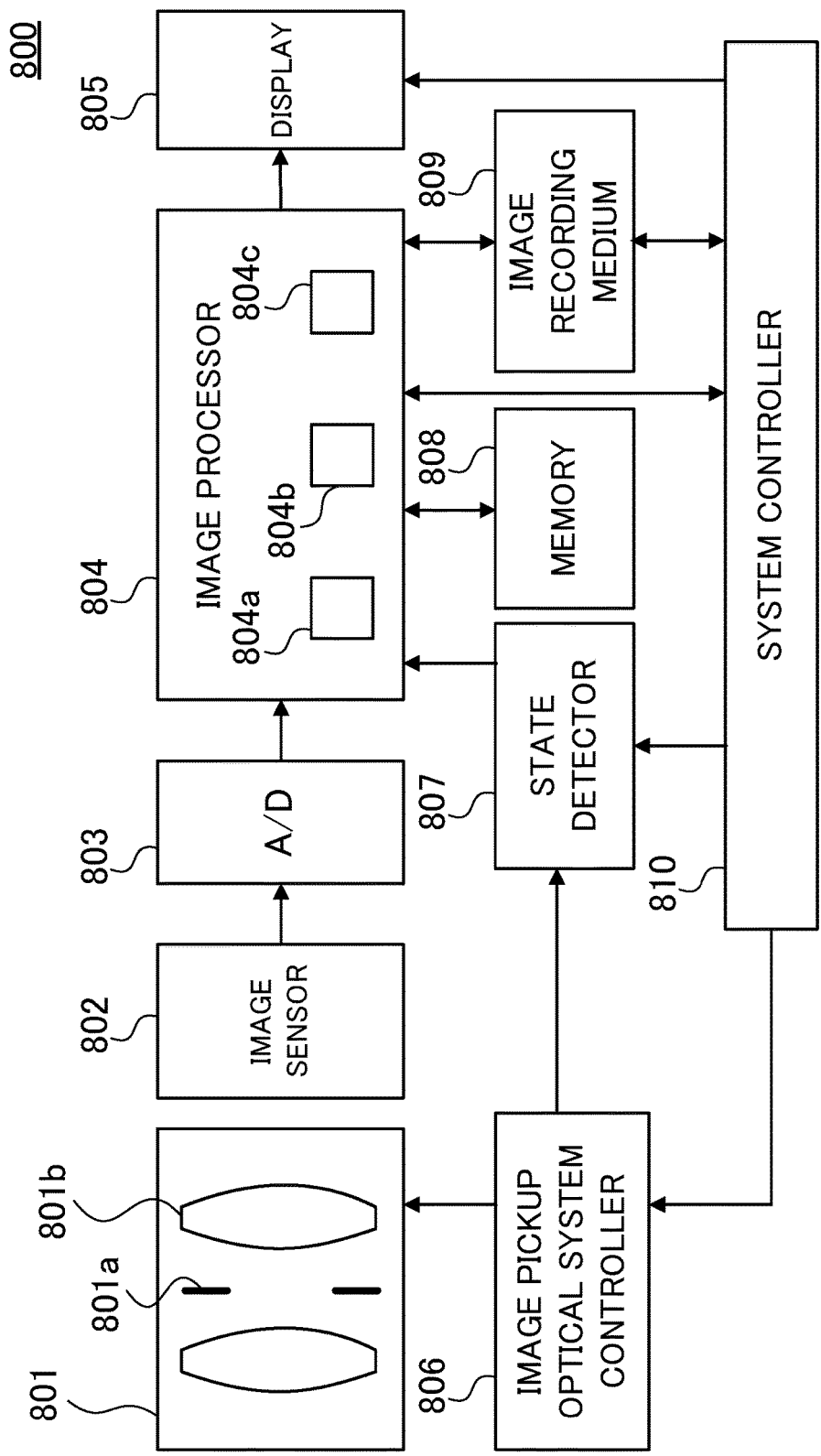
FIG. 8 is a block diagram of an image pickup apparatus in Embodiment 2.

First of all, referring to FIG. 1, an image processing method (image restoration processing) in Embodiment 1 of the present invention will be described. FIG. 1 is a flowchart of the image processing method in this embodiment. Each step in FIG. 1 is performed by each unit (i.e., each of units having the same functions of the classifier 804a, the calculation processor 804b, and the image restorer 804c that are illustrated in FIG. 8) of an image processing apparatus.

The image processing apparatus previously selects an image group (a plurality of images) as a target of the image restoration processing according to an operation of a user or the like. Then, the image processing apparatus starts the image restoration processing in this embodiment for the selected images (i.e., selected image group). First, at step S101, the image processing apparatus acquires an image capturing condition (image capturing condition information) based on Exif (Exchangeable image file format) information or the like that is added to each of the selected images (the plurality of images as a targeted pixel group).

The image capturing condition includes, as an image capturing condition of the image pickup optical system, a lens identification number (lens ID) for specifying a lens for photography, a focal length for the photography, an F number, an object distance, and the like. An optical transfer function (OTF) of an optical aerial image can be specified based on a combination of the lens ID, the focal length, the F number, and the object distance. The optical aerial image is an optical image that is imaged on a sensor of the image pickup apparatus (camera) and that is not discretized. The image capturing condition includes as an image capturing condition of the image sensor, a sensor size, a pixel pitch, and a color filter array information of the image sensor, and the like. The sensor size of the image sensor is information for specifying an image circle to cut the optical aerial image out. The pixel pitch is information relating to a folding signal of the optical transfer function. Furthermore, information relating to an optical low-pass filter can be added to the image capturing condition. The information relating to the optical low-pass filter is information indicating the existence of the optical low-pass filter and a separation width and a separation direction of a PSF caused by the optical low-pass filter. The color filter array information is information indicating an array of PGB pixels in a single-plate sensor.

Subsequently, at step S102, the image processing apparatus (classifier) classifies (groups) the selected pixel group (the plurality of images as a targeted pixel group) for each of images where (the combinations of) the image capturing conditions acquired at step S101 coincide with each other. As described above, the image capturing condition may be acquired at the time of capturing the image, and it may be recorded as additional information. Accordingly, the coincidence of the image capturing conditions is not limited to a case where all image capturing conditions coincide with each other, and it includes a case where the image capturing conditions coincide with each other in an acquirable range as the additional information of the image with respect to the image capturing condition such as the object distance and the focal length.

Subsequently, at step S103, the image processing apparatus (calculation processor) generates an optical transfer function (optical transfer function information) that is reflected by the image capturing condition corresponding to each group for the images in each group (i.e., the plurality of images classified into each group). Then, the image processing apparatus generates an image restoration filter based on the optical transfer function corresponding to the image capturing condition of each group, and it performs restoration processing on the plurality of images classified into each group. In this embodiment, the image processing apparatus may generate a point spread function (point spread function information) instead of the optical transfer function (optical transfer function information). The optical transfer function information and the point spread function information are unique (specific) information for each image capturing condition.

The image processing apparatus uses common parameters to images in each group as parameters (restoration parameters) set in generating the image restoration filter. For example, there is the adjustment term $\Gamma$ (restoration gain or restoration gain adjustment term) in expression (4) as one of the common parameters. However, this embodiment is not limited thereto and parameters relating to an expression that is obtained by deforming expression (4) may be common. The common parameters are all or at least a part of parameters that are to be set in addition to the optical transfer function $H(u,v)$. As described above, the image processing apparatus commonalizes processing (processing such as setting each parameter for the image restoration processing and generating the image restoration filter) that is capable of being commonalized with respect to the images in each group (i.e., the image processing apparatus performs common calculation processing).

The image restoration processing is processing of correcting a deterioration (degradation) of an image (captured image) based on the optical transfer function, and accordingly a common optical transfer function can be used for images where image capturing conditions coincide with each other. In this embodiment, when the image restoration processing is performed on a plurality of images, a set of optical transfer functions is used for the plurality of images where the image capturing conditions coincide with each other, and thus the number of generation times of the optical transfer function is reduced and the image restoration processing can be performed at high speed (i.e., the image restoration processing can be shortened).

Finally, at step S104, the image processing apparatus (image restorer) generates and outputs restored image groups (a plurality of restored images) for each group.

Figure 2:
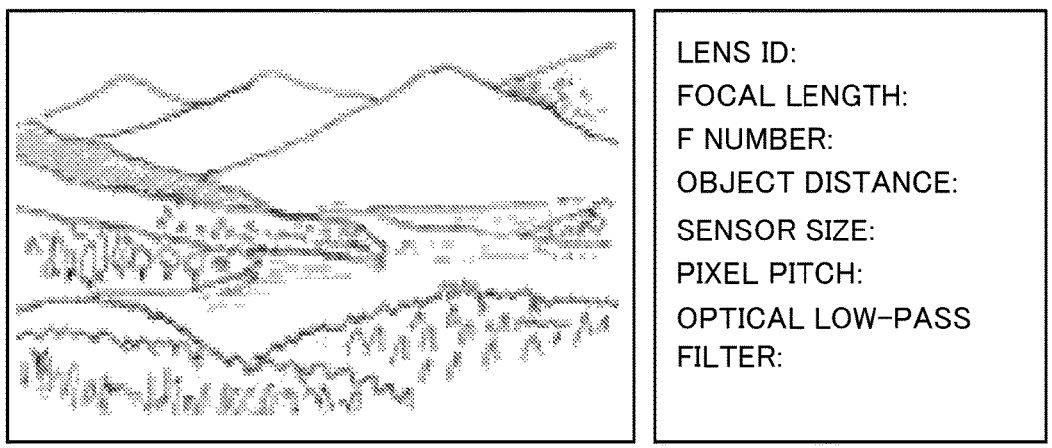
FIG. 2 is an explanatory diagram of a captured image and an image capturing condition in Embodiment 1.

Next, referring to FIG. 2, the image (captured image) in this embodiment and the image capturing condition added to the image will be described. FIG. 2 is a diagram of illustrating an example of the captured image and the image capturing condition. As described above, the image pickup apparatus records the image capturing condition (image capturing condition information) for the photography in detail, as well as each captured image. In other words, data of each captured image include the image capturing condition information. With respect to information relating to an image sensor (sensor) in the image capturing condition, the image pickup apparatus stores the identification number such as a sensor ID and it verifies information relating to a sensor size and a pixel pitch corresponding to the sensor ID to record the information along with the captured image. Similarly, the image pickup apparatus can verify information relating to the optical low-pass filter to record the information along with the captured image.

Figure 3:
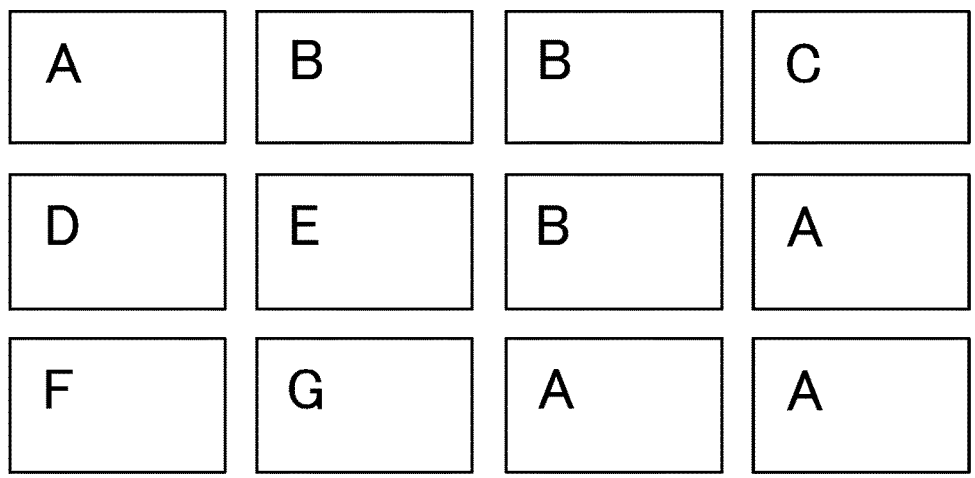
FIG. 3 is an explanatory diagram of grouping of a plurality of images in Embodiment 1.
Figure 3:
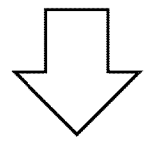
Figure 3:
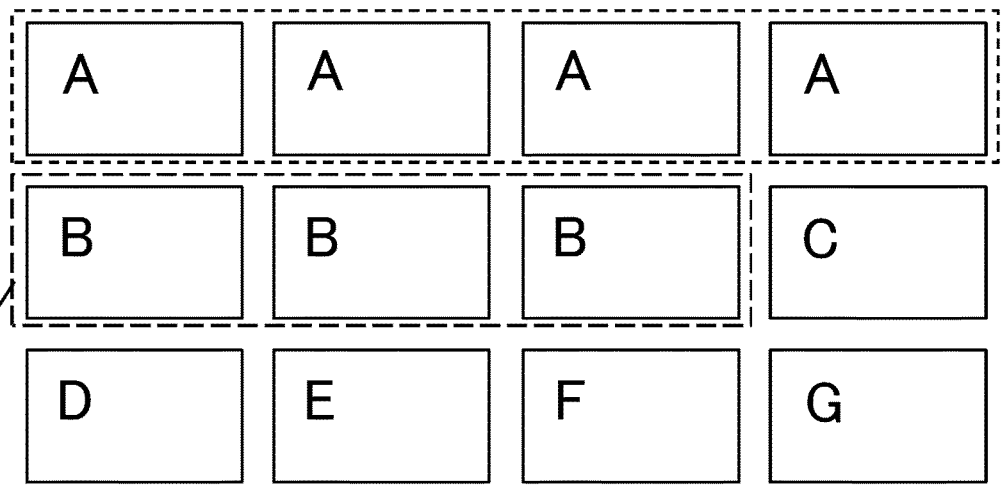

Next, referring to FIG. 3, grouping (grouping processing) of a plurality of images for each image capturing condition will be described. FIG. 3 is an explanatory diagram of grouping of the plurality of images for each image capturing condition. The image processing apparatus classifies a captured image group (a plurality of captured images) into image capturing conditions A to G according to the image capturing condition as a combination of information for example relating to the lens ID, the focal length, the F number, the object distance, the sensor size, the pixel pitch, the optical low-pass filter, and the pixel array of the color filter. Then, the image processing apparatus rearranges the plurality of captured images included in the captured image group for each of the image capturing conditions A to G, and it groups the captured images into groups A to G (i.e., performs grouping of the plurality of captured images).

In this embodiment, the object distance in the image capturing condition does not change to provide a substantial influence on the image restoration processing if the object distance is larger than a predetermined distance. Accordingly, when the object distance of a certain captured image is larger than the predetermined distance, the object distance of the captured image can be regarded as the predetermined distance. In other words, while plurality of captured images where the object distances are larger than the predetermined distance have different object distances from each other in reality, they may be regarded as captured images where all the object distances are equal to the same object distance (i.e., predetermined distance). As a result, compared with a case where an identity of the object distance is strictly required, the number of captured images classified into the same group increases and accordingly the time required for the restoration processing can be further shortened.

In this embodiment, the information relating to the pixel array of the color filter is the same with respect to various image pickup apparatuses in many cases, and accordingly the information may not be included in the image capturing condition (or a condition used to determine the grouping of the plurality of captured images). The image pickup apparatus can include a user interface explicitly indicating that the plurality of captured images are grouped for each image capturing condition.

Figure 4:
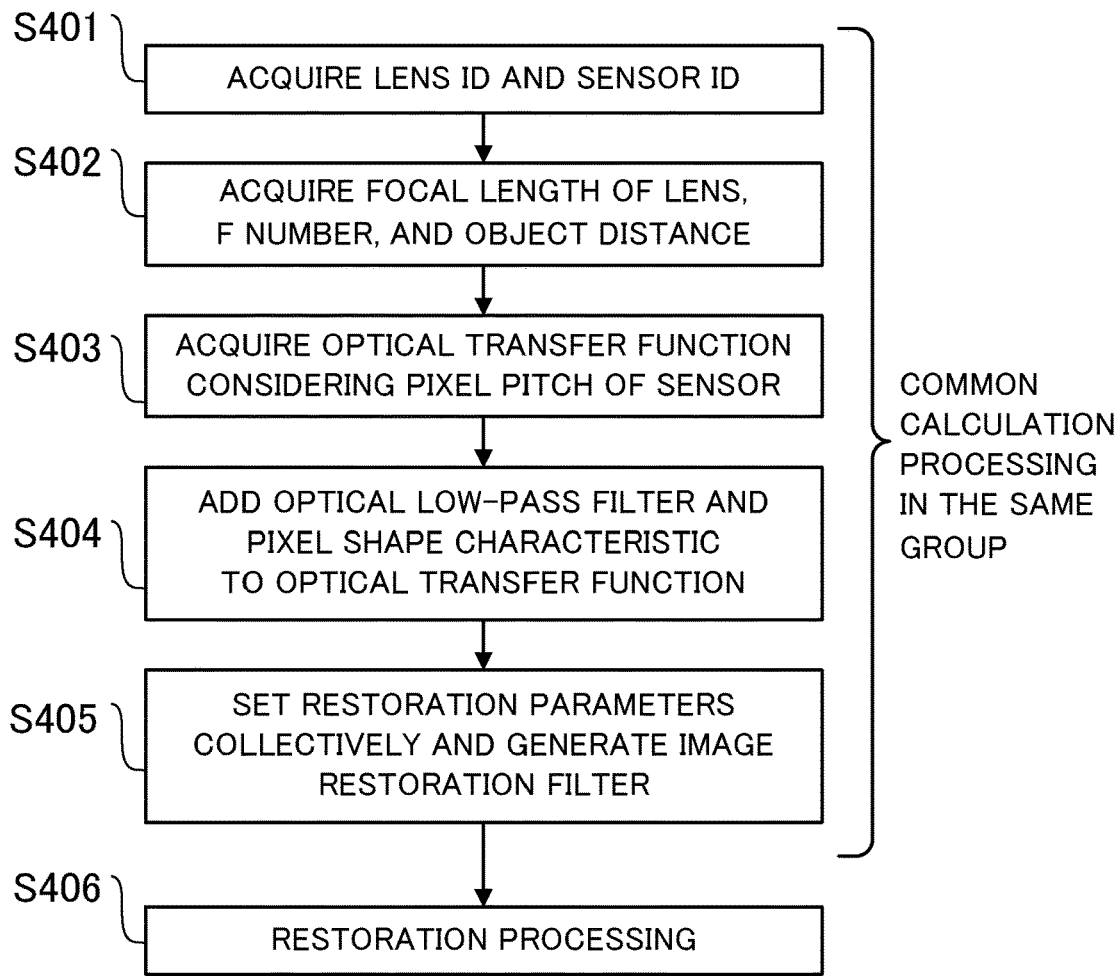
FIG. 4 is a flowchart of common calculation processing on a plurality of images in each group in Embodiment 1.

Next, referring to FIG. 4, common calculation processing on a plurality of images in each group will be described. FIG. 4 is a flowchart of the common calculation processing on the plurality of images in each group, and it illustrates a flowchart of image restoration processing on a captured image group (a plurality of captured images) grouped as the same image capturing condition. Each step in FIG. 4 is performed by each unit (calculation processor and image restorer) of the image processing apparatus.

First, at step S401, the image processing apparatus acquires the lens ID and the sensor ID. Subsequently, at step S402, the image processing apparatus acquires the focal length of the lens, the F number, and the object distance. As described above, these image capturing conditions are recorded along with the captured image, and accordingly they can be acquired from targeted captured images. Subsequently, at step S403, the image processing apparatus acquires the optical transfer function information considering the pixel pitch of the sensor. The optical transfer function information (OTF or data for generating the OTF) is stored in a memory (storage unit) provided inside or outside the image processing apparatus, and the image processing apparatus can acquire the optical transfer function information depending on the image capturing condition from the memory. Subsequently, at step S404, the image processing apparatus adds (reflects) the optical low-pass filter and the pixel shape characteristic to the optical transfer function acquired at step S403. Subsequently, at step S405, the image processing apparatus collectively sets parameters (restoration parameters) that are used for the image restoration processing, and it generates an image restoration filter. Finally, at step S406, the image processing apparatus performs restoration processing (individually) on each of the plurality of captured images.

In this embodiment, steps S401 to S405 are common calculation processing on the plurality of captured images included in each group (i.e., common calculation processing in the same group). The common calculation processing is calculation processing that is performed on the grouped captured images (the plurality of images included in each group) in common, and it is performed only in the restoration processing on a first image. With respect to a second image and subsequent images, data generated for the first image (i.e., data generated by the common calculation processing) are used in common. In other words, if the lens ID, the sensor ID, the focal length of the lens, the F number, and the object distance are determined, all the acquisition of the optical transfer function reflecting the pixel pitch, the optical low-pass filter, the pixel shape characteristic, and the like are also uniquely determined. The image processing apparatus of this embodiment performs image restoration processing on each image with a common strength by using the optical transfer function considering all of them. The image processing apparatus of this embodiment can be performed for example by software that operates on a personal computer.

Figure 5:
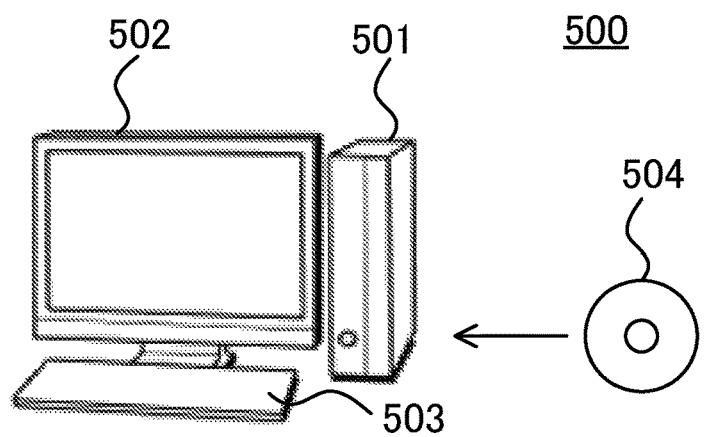
FIG. 5 is a configuration diagram of an image processing system in Embodiment 1.

Next, referring to FIG. 5, an image processing system (image processing apparatus) in this embodiment will be described. FIG. 5 is a configuration diagram of an image processing system 500 in this embodiment. The image processing system 500 includes an image processing apparatus 501 (hardware as an information processing apparatus), a display device 502 (monitor), and an input device 503 (input unit such as a keyboard). This embodiment will describe a case in which the image processing method operates on the image processing system 500 (software installed in a personal computer). The image processing apparatus 501 includes each unit having the same functions as those of the classifier 804a, the calculation processor 804b, and the image restorer 804c that are illustrated in FIG. 8.

First, in order to cause the image processing apparatus 501 to operate the image processing method of this embodiment, the software (image processing program) which executes the image processing method is installed in the image processing apparatus 501 (personal computer). The software can be installed from a medium 504 (storage medium) such as a CD-ROM or a DVD-ROM. Alternatively, the software may be installed through download via a network (internet). The image processing apparatus 501 stores optical transfer function information or point spread function information for each image capturing condition. The optical transfer function information or the point spread function information is downloaded via the medium 504 or the network to be stored in the image processing apparatus 501. In this embodiment, software (image processing program), data such as the optical transfer function information, the point spread function information, and the image capturing condition information are stored in a storage such as a hard disk and a memory in the image processing apparatus 501. The image processing apparatus 501 can be configured to acquire at least part of data from an external server via the network.

The image processing apparatus 501 runs the installed software to perform the image restoration processing on the captured image. On the software, various settings (settings of parameters), such as the strength (restoration gain) of the image restoration processing and the application of the image restoration processing only in a predetermined region (region where the image restoration processing is to be performed) of an image, are possible. It is preferred that a user can change these parameters while confirming the restored image on the display device 502.

Embodiment 2

Figure 6:
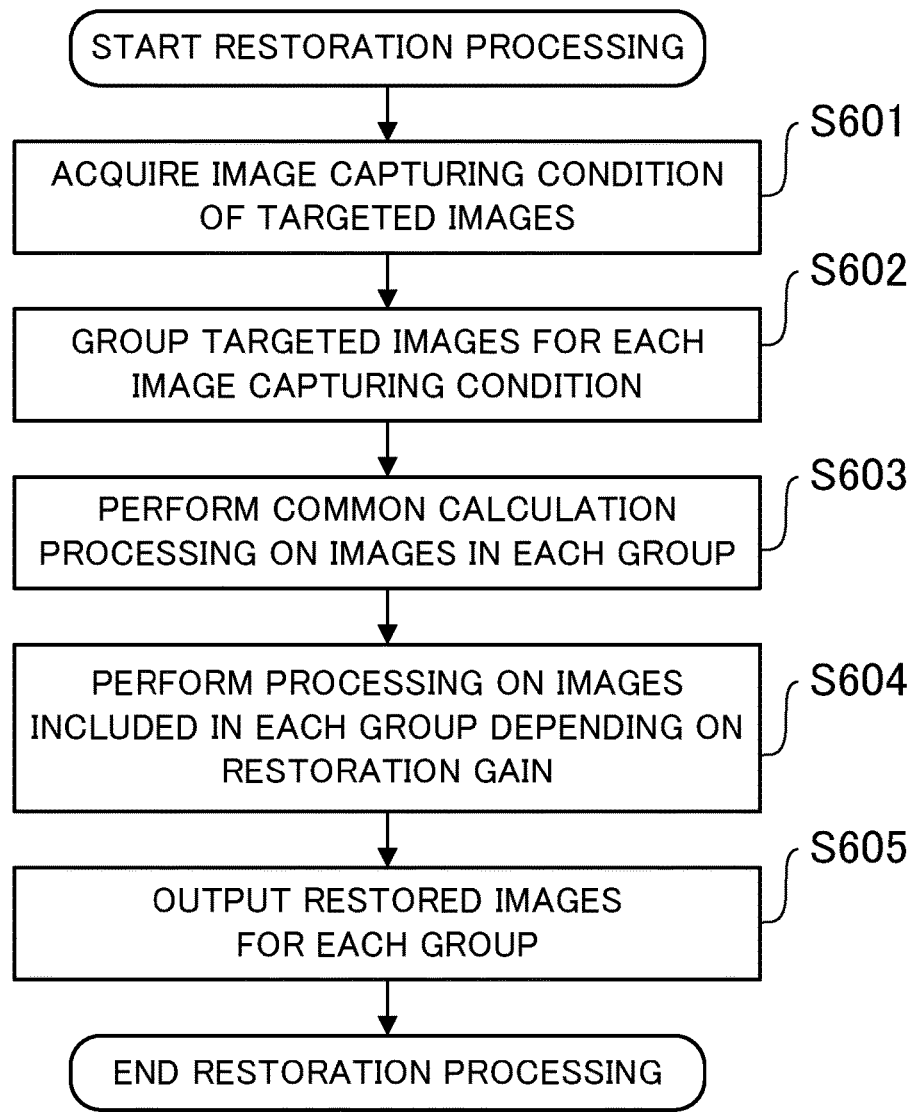
FIG. 6 is a flowchart of an image processing method in Embodiment 2.

Next, referring to FIG. 6, an image processing method (image restoration processing) in Embodiment 2 of the present invention will be described. FIG. 6 is a flowchart of the image processing method in this embodiment. Each step in FIG. 6 is performed by each unit (i.e., each of units having the same functions of the classifier 804a, the calculation processor 804b, and the image restorer 804c that are illustrated in FIG. 8) of an image processing apparatus.

The image processing apparatus of this embodiment performs processing individually (separately) on images included in each group depending on a restoration gain, and thus it is different from the image processing apparatus of Embodiment 1 that does not perform such processing. Steps S601 to S603 and S605 in FIG. 6 are the same as steps S101 to S104 in FIG. 1, and accordingly descriptions thereof are omitted.

At step S604, the image processing apparatus performs the processing individually (separately) on an image group (a plurality of images) included in each group depending on a restoration gain. In other words, the image processing apparatus of this embodiment, similarly to Embodiment 1, generates a common optical transfer function (optical transfer function information) or point spread function (point spread function information) with respect to the plurality of images by common calculation processing as described above for the plurality of images having the same image capturing condition. Then, the image processing apparatus sets parameters (restoration parameters) different from each other for each of the plurality of images in the same group to generate an image restoration filter (step S604).

In this embodiment, one of the restoration parameters is for example the adjustment term $\Gamma$ (restoration gain or restoration gain adjustment term) in expression (4). However, this embodiment is not limited thereto and parameters relating to an expression that is obtained by deforming expression (4) may be common. The common parameters are all or at least a part of parameters that are to be set in addition to the optical transfer function H(u,v). In this embodiment, each parameter is set by reflecting an intent of a user who tries to perform the image restoration processing. Accordingly, the user can arbitrarily set a strength of the restoration processing, a strength of suppressing a harmful effect, and the like. A parameter group that is to be applied to each image can be previously described (stored) in a file or the like to perform batch processing.

Figure 7:
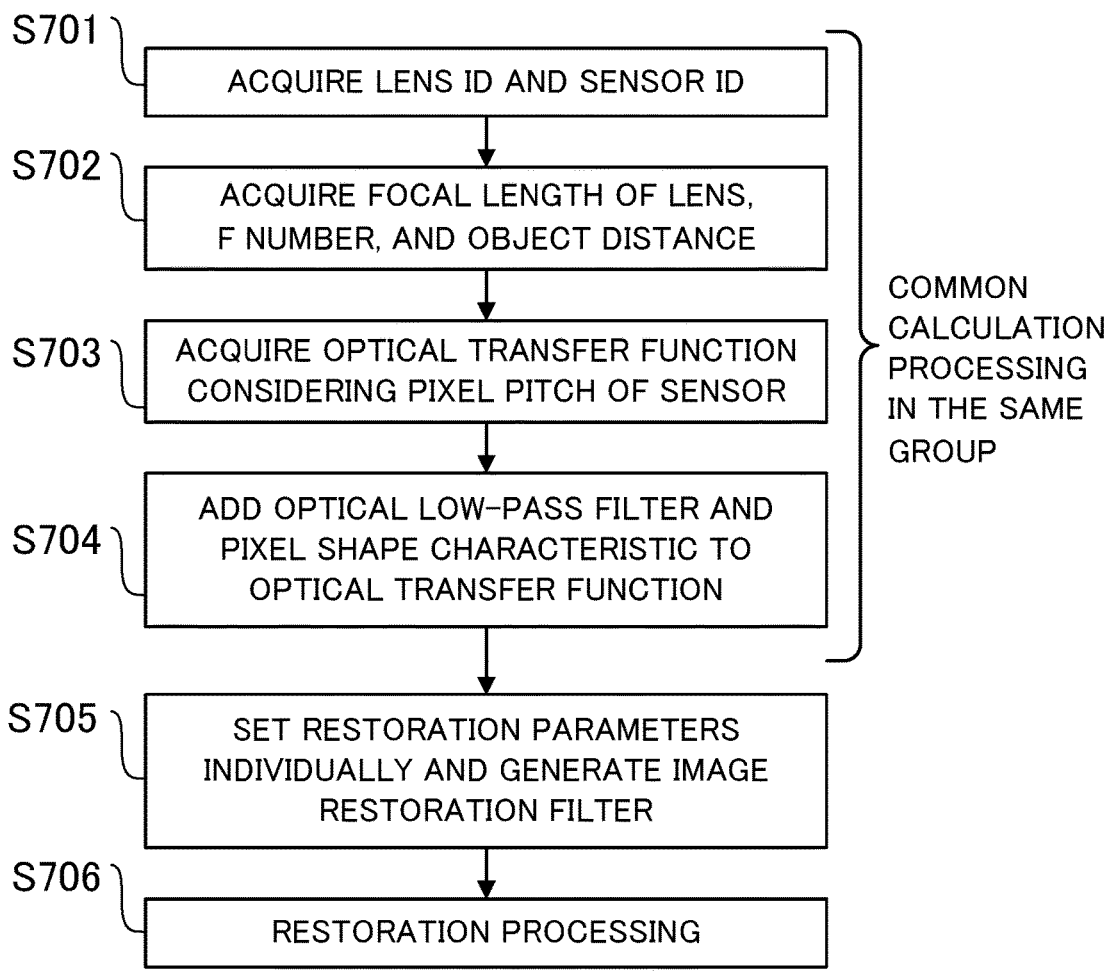
FIG. 7 is a flowchart of common calculation processing on a plurality of images included in each group in Embodiment 2.

Next, referring to FIG. 7, common calculation processing on a plurality of images in each group will be described. FIG. 7 is a flowchart of the common calculation processing on the plurality of images in each group, and it illustrates a flowchart of the image restoration processing on a captured image group (a plurality of captured images) grouped as the same image capturing condition. Each steps in FIG. 7 is performed by each unit (calculation processor 804b and image restorer 804c that are illustrated in FIG. 8) of the image processing apparatus.

The image processing apparatus of this embodiment individually (separately) sets restoration parameters used for the image restoration processing, and thus it is different from the image processing apparatus of Embodiment 1 where the restoration parameters are collectively set. Steps S701 to S704 and S706 in FIG. 7 are the same as steps S401 to S404 and S406 in FIG. 4, respectively, and accordingly descriptions thereof are omitted.

In this embodiment, steps S701 to S704 correspond to the common calculation processing in each group. At step S705, the image processing apparatus individually sets the parameters (restoration parameters) that are used for the image restoration processing to generate the image restoration filter. The image processing method of this embodiment can be performed for example by the image processing apparatus provided in an image pickup apparatus.

Next, referring to FIG. 8, an outline of an image pickup apparatus in this embodiment will be described. FIG. 8 is a block diagram of an image pickup apparatus 800 in this embodiment. The image pickup apparatus 800 includes an image processor 804 (image processing apparatus) capable of performing the image processing method described above.

In the image pickup apparatus 800, an object (not illustrated) is imaged on an image sensor 802 (image pickup element) via an image pickup optical system 801 (optical system) including an aperture stop 801a (or light shielding member) and a focus lens 801b. In this embodiment, the image pickup optical system 801 is an interchangeable lens (lens apparatus) removably mounted on an image pickup apparatus body including the image sensor 802. This embodiment, however, is not limited to this, and can be applied also to an image pickup apparatus including an image pickup apparatus body and an image pickup optical system 801 integrated with each other.

An aperture value (F number) is determined by the aperture stop 801a or the light shielding member. The image sensor 802 photoelectrically converts an object image (optical image) formed via the image pickup optical system 801 to output an image signal (captured image data). An electric signal output from the image sensor 802 is output to an A/D converter 803. The A/D converter 803 converts the electric signal (analog signal) input from the image sensor 802 to a digital signal (captured image) and then outputs the digital signal to the image processor 804. The image sensor 802 and the A/D converter 803 constitute an image pickup unit configured to photoelectrically convert the optical image (object image) formed via the image pickup optical system 801 to output the captured image.

The image processor 804 performs predetermined image processing on the digital signal output from the A/D converter 803, i.e., image generated based on the image signal output from the image sensor 802, by using information of a state detector 807 and a memory 808. Especially, the image processor 804 of this embodiment performs image restoration processing on the captured image to output a corrected image (restored image).

The image processor 804 includes a classifier 804a, a calculation processor 804b, and an image restorer 804c. The classifier 804a classifies a plurality of captured images into groups for each image capturing condition. The calculation processor 804b performs common calculation processing on a plurality of images classified into the same group, and it generates (unique) optical transfer function information or point spread function information for each image capturing condition. The image restorer 804c performs restoration processing on the plurality of images based on the optical transfer function information or the point spread function information.

The memory 808 (storage unit) stores optical transfer function information for each image capturing condition (image capturing condition information). The image capturing condition is for example acquired by the image pickup optical controller 806 or the state detector 807. In this embodiment, the memory which stores the optical transfer function information can be included in the image processor 804.

The image processor 804 acquires the optical transfer function corresponding to the acquired image capturing condition, and it adds an optical low-pass filter or a pixel shape characteristic to the optical transfer function. The image processor 804 (image restorer 804c) reads image data from the memory 808, and it performs the image restoration processing by using the optical transfer function or the point spread function. In the image restoration processing, various settings (settings of parameters), such as application of the image restoration processing only in a predetermined region (region where the image restoration processing is to be performed) of an image, are possible. It is preferred that a user can change these parameters while confirming the restored image on the display 805.

The output image (restored image) processed by the image processor 804 is recorded in an image recording medium 809 in a predetermined format. A display 805 displays an image obtained by performing predetermined processing for display on the processed image in this embodiment. Alternatively, the display 805 may display a simply-processed image for high-speed display. The display 805 also displays a GUI to select an image restoration mode or a normal image capturing mode by a user. When the image restoration mode is selected by the user via the GUI on the display 805, a system controller 810 controls the image processor 804 to perform the image processing method of this embodiment (or Embodiment 1).

The system controller 810 includes a CPU, an MPU, or the like, and it controls a whole of the image pickup apparatus 800. More specifically, the system controller 810 controls each of the image processor 804, the display 805, the image pickup optical system controller 806, the state detector 807, and the image recording medium 809. The image pickup optical system controller 806 controls the motion of the image pickup optical system 801. The state detector 807 detects a state of the image pickup optical system 801 based on information of the image pickup optical system controller 806. In the image pickup apparatus 800, software (an image processing program) that realizes the image processing method described above can be supplied to the system controller 810 via a network or a storage medium, and then the system controller 810 can read out and execute the image processing program.

As described above, in each embodiment, the image processing apparatus (image processing apparatus 501 or image processor 804) includes the classifier 804a, the calculation processor 804b, and the image restorer 804c. The classifier classifies a plurality of captured images into groups for each image capturing condition (i.e., classifies the plurality of captured images into groups each includes a plurality of images having the same image capturing condition). The calculation processor performs common calculation processing on a plurality of images classified into the same group and generate optical transfer function information (OTF or data for generating the OTF) or point spread function information (PSF or data for generating the PSF) for each image capturing condition. The image restorer performs restoration processing on the plurality of images based on the optical transfer function information or the point spread function information.

Preferably, the calculation processor sets a common restoration parameter to the plurality of images during the common calculation processing and generate an image restoration filter by using the common restoration parameter. Preferably, the calculation processor sets a restoration parameter individually to each of the plurality of images classified into the same group based on the optical transfer function information or the point spread function information generated by the common calculation processing. Then, the calculation processor generates an image restoration filter by using the individually-set restoration parameter. More preferably, the restoration parameter is a restoration gain that is used to perform the restoration processing.

Preferably, the image capturing condition is determined based on a combination of a parameter of an image pickup optical system that is used to capture an image and a parameter of an image sensor. Then, the classifier classifies, as the same group, the plurality of images which coincide with each other in the combination of the parameter of the image pickup optical system and the parameter of the image sensor.

Preferably, when image capturing conditions of the plurality of captured images are the same, the classifier classifies the plurality of captured images into the same group. More preferably, the image capturing condition includes an object distance. When the object distance is larger than a predetermined distance, the classifier regards the object distance as the predetermined distance to determine whether or not the image capturing conditions of the plurality of captured images are the same.

Preferably, the plurality of captured images include a first captured image where the object distance is a first object distance and a second captured image where the object distance is a second object distance larger than the first object distance. The classifier classifies the first captured image and the second captured image into different groups from each other when the first object distance is smaller than a predetermined distance. On the other hand, the classifier classifies the first captured image and the second captured image into the same group when the first object distance is larger than the predetermined distance and the image capturing conditions other than the object distances in the first and second captured images are the same.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, an image processing apparatus, an image pickup apparatus, an image processing method, and a non-transitory computer-readable storage medium which are capable of performing restoration processing on a large number of images in a short time can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-160494, filed on Aug. 17, 2015, which is hereby incorporated by reference herein in its entirety.

What is claimed is:

1. An image processing apparatus comprising:
a memory storing instructions; and
a processor configured to implement the stored instructions to execute a plurality of tasks, including:
   an acquiring task that acquires a plurality of captured images and an image capturing condition of each of the plurality of captured images;
   a classifying task that classifies the plurality of captured images into groups, which include a first group and a second group, based on the image capturing condition of each of the plurality of captured images;
   a calculating task that performs, after the classifying task has finished classifying all of a plurality of images belong to one of the first group or the second group:
      first common calculation processing on the first group of images to generate first optical transfer function information or point spread function information for the first group of images; and
      second common calculation processing on the second group of images to generate second optical transfer function information or point spread function information for the second group of images, the second optical transfer function information or point spread function information being different from the first optical transfer function information or point spread function information; and an image restoring task that performs:
first restoration processing on the first group of images based on the first optical transfer function information or the point spread function information generated by the first common calculation processing; and
second restoration processing on the second group of images based on the second optical transfer function information or the point spread function information generated by the second common calculation processing.

2. The image processing apparatus according to claim 1, wherein the calculating task sets a common restoration parameter to the first or second group of images during the first or second common calculation processing and generates an image restoration filter using the common restoration parameter.

3. The image processing apparatus according to claim 1, wherein the calculating task sets a restoration parameter individually to each of the plurality of images classified into the first or second group based on the optical transfer function information or the point spread function information generated by the first or second common calculation processing, and generates an image restoration filter using the individually-set restoration parameter.

4. The image processing apparatus according to claim 2, wherein the restoration parameter is a restoration gain that is used to perform the restoration processing.

5. The image processing apparatus according to claim 1, wherein:
each of the image capturing conditions is determined based on a combination of a parameter of an image pickup optical system that is used to capture an image and a parameter of an image sensor, and
the classifying task classifies, as a same group, the plurality of images that coincide with each other in the combination of the parameter of the image pickup optical system and the parameter of the image sensor.

6. The image processing apparatus according to claim 1, wherein when image capturing conditions of the plurality of captured images are the same, the classifying task classifies the plurality of captured images into a same group.

7. The image processing apparatus according to claim 6, wherein:
each of the image capturing conditions includes an object distance, and
when the object distance is larger than a predetermined distance, the classifying task regards the object distance as the predetermined distance to determine whether or not the image capturing conditions of the plurality of captured images are the same.

8. The image processing apparatus according to claim 6, wherein:
each of the image capturing conditions includes an object distance,
the plurality of captured images include a first captured image where the object distance is a first object distance and a second captured image where the object distance is a second object distance larger than the first object distance, and
the classifying task:
classifies the first captured image and the second captured image into different groups from each other when the first object distance is smaller than a predetermined distance, and
classifies the first captured image and the second captured image into the same group when the first object distance is larger than the predetermined distance and the image capturing conditions other than the object distances in the first and second captured images are the same.

9. An image pickup apparatus comprising:
an image sensor configured to photoelectrically convert an optical image formed via an image pickup optical system to output image data;
a memory storing instructions; and
a processor configured to implement the stored instructions to execute a plurality of tasks, including:
an acquiring task that acquires a plurality of captured images and an image capturing condition of each of the plurality of captured images;
a classifying task that classifies the plurality of captured images into groups, which include a first group and a second group, based on the image capturing condition of each of the plurality of captured images;
a calculating task that performs, after the classifying task has finished classifying all of a plurality of images belong to one of the first group or the second group:
first common calculation processing on the first group of images to generate first optical transfer function information or point spread function information for the first group of images; and
second common calculation processing on the second group of images to generate second optical transfer function information or point spread function information for the second group of images, the second optical transfer function information or point spread function information being different from the first optical transfer function information or point spread function information; and
an image restoring task that performs:
first restoration processing on the first group of images based on the first optical transfer function information or the point spread function information generated by the first common calculation processing; and
second restoration processing on the second group of images based on the second optical transfer function information or the point spread function information generated by the second common calculation processing.

10. An image processing method comprising the steps of:
acquiring a plurality of captured images and an image capturing condition of each of the plurality of captured images;
classifying the plurality of captured images into groups, which includes a first group and a second group, based on the capturing condition of each of the plurality of captured images;
performing, after the classifying step has finished classifying all of a plurality of images belong to one of the first group or the second group:
first common calculation processing on the first group of images and generating first optical transfer function information or point spread function information for the first group of images; and
second common calculation processing on the second group of images and generating second optical transfer function information or point spread function information for the second group of images, the second optical transfer function information or point spread function information being different from the first optical transfer function information or point spread function information;

performing first restoration processing on the first group of images based on the first optical transfer function information or the point spread function information generated by the first common calculation processing; and performing second restoration processing on the second group of images based on the second optical transfer function information or the point spread function information generated by the second common calculation processing.

11. A non-transitory computer-readable storage medium storing a program executable by a computer to execute a process comprising the steps of:

acquiring a plurality of captured images and an image capturing condition of each of the plurality of captured images;

classifying the plurality of captured images into groups, which includes a first group and a second group, based on the capturing condition of each of the plurality of captured images;

performing, after the classifying step has finished classifying all of a plurality of images belong to one of the first group or the second group:

first common calculation processing on the first group of images and generating first optical transfer function information or point spread function information for the first group of images; and second common calculation processing on the second group of images and generating second optical transfer function information or point spread function information for the second group of images, the second optical transfer function information or point spread function information being different from the first optical transfer function information or point spread function information;

performing first restoration processing on the first group of images based on the first optical transfer function information or the point spread function information generated by the first common calculation processing; and performing second restoration processing on the second group of images based on the second optical transfer function information or the point spread function information generated by the second common calculation processing.

* * * * *